United States Patent
Floyd et al.

(10) Patent No.: US 7,829,495 B2
(45) Date of Patent: Nov. 9, 2010

(54) OLEFIN POLYMERIZATION PROCESS WITH ALKYL-SUBSTITUTED METALLOCENES

(75) Inventors: Joseph C. Floyd, Baytown, TX (US); Moses Olukayode Jejelowo, Kingwood, TX (US); Donna Jean Crowther, Baytown, TX (US); George Alan Vaughan, Houston, TX (US); Ching Tai Lue, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 10/930,144

(22) Filed: Aug. 31, 2004

(65) Prior Publication Data

US 2005/0032992 A1 Feb. 10, 2005

Related U.S. Application Data

(62) Division of application No. 10/127,984, filed on Apr. 22, 2002, now Pat. No. 6,800,704, which is a division of application No. 09/615,296, filed on Jul. 13, 2000, now Pat. No. 6,489,413, which is a division of application No. 09/400,568, filed on Sep. 21, 1999, now Pat. No. 6,759,499.

(60) Provisional application No. 60/021,841, filed on Jul. 16, 1996.

(51) Int. Cl.
*B01J 31/00* (2006.01)
(52) U.S. Cl. .................................... 502/152; 502/158
(58) Field of Classification Search ............ 502/152, 502/158
See application file for complete search history.

(56) References Cited

U.S. PATENT DOCUMENTS

| 4,182,810 A | 1/1980 | Willcox |
| 4,543,399 A | 9/1985 | Jenkins, III et al. |
| 4,588,790 A | 5/1986 | Jenkins, III et al. |
| 4,701,432 A | 10/1987 | Welborn, Jr. |

(Continued)

FOREIGN PATENT DOCUMENTS

EP 0 308 177 B1 7/1989

(Continued)

OTHER PUBLICATIONS

"Alkyl-substituted Metallocene Catalyst Capable of Narrow MIR Ethylene Coplymers," Research Disclosure, p. 481-483, (1996).

(Continued)

*Primary Examiner*—William K Cheung

(57) ABSTRACT

The invention comprises an olefin polymerization process comprising contacting ethylene alone or with one or more olefinically unsaturated comonomers with a Group 3-6 metallocene catalyst compound comprising one π-bonded ring having a $C_3$ or greater hydrocarbyl, hydrocarbylsilyl or hydrocarbylgermyl substituent said substituent bonded to the ring through a primary carbon atom; and, where the compound contains two π-bonded rings, the total number of substituents on the rings is equal to a number from 3 to 10, said rings being asymmetrically substituted where the number of substituents is 3 or 4. The invention process is particularly suitable for preparing ethylene copolymers having an MIR less than about 35, while retaining narrow CD even at high comonomer incorporation rates, and with certain embodiments providing ethylene copolymers having improved melt strength with the low MIR.

25 Claims, 1 Drawing Sheet

U.S. PATENT DOCUMENTS

| | | | |
|---|---|---|---|
| 4,767,735 A | 8/1988 | Ewen et al. | |
| 4,808,561 A | 2/1989 | Welborn, Jr. | |
| 4,897,455 A | 1/1990 | Welborn, Jr. | |
| 4,912,075 A | 3/1990 | Chang | |
| 4,914,253 A | 4/1990 | Chang | |
| 4,935,397 A | 6/1990 | Chang | |
| 4,937,217 A | 6/1990 | Chang | |
| 4,937,301 A | 6/1990 | Chang | |
| 4,975,403 A | 12/1990 | Ewen | |
| 5,008,228 A | 4/1991 | Chang | |
| 5,028,670 A | 7/1991 | Chinh et al. | |
| 5,036,034 A | 7/1991 | Ewen | |
| 5,086,025 A | 2/1992 | Chang | |
| 5,091,352 A | 2/1992 | Kioka et al. | |
| 5,126,303 A | 6/1992 | Resconi et al. | |
| 5,132,262 A * | 7/1992 | Rieger et al. | 502/117 |
| 5,145,819 A | 9/1992 | Winter et al. | |
| 5,147,949 A | 9/1992 | Chang | |
| 5,198,401 A | 3/1993 | Turner et al. | |
| 5,238,892 A | 8/1993 | Chang | |
| 5,240,894 A | 8/1993 | Burkhardt et al. | |
| 5,241,025 A | 8/1993 | Hlatky et al. | |
| 5,243,001 A | 9/1993 | Winter et al. | |
| 5,264,405 A | 11/1993 | Canich | |
| 5,274,056 A | 12/1993 | McDaniel et al. | |
| 5,276,208 A | 1/1994 | Winter et al. | |
| 5,278,264 A | 1/1994 | Spaleck et al. | |
| 5,279,999 A | 1/1994 | DeBoer et al. | |
| 5,292,838 A * | 3/1994 | Razavi | 526/160 |
| 5,296,434 A | 3/1994 | Karl et al. | |
| 5,324,800 A | 6/1994 | Welborn, Jr. et al. | |
| 5,329,031 A | 7/1994 | Miyake et al. | |
| 5,329,033 A | 7/1994 | Spaleck et al. | |
| 5,330,948 A | 7/1994 | Marks et al. | |
| 5,350,817 A | 9/1994 | Winter et al. | |
| 5,352,749 A | 10/1994 | DeChellis et al. | |
| 5,359,015 A | 10/1994 | Jejelowo | |
| 5,382,638 A | 1/1995 | Bontemps et al. | |
| 5,405,922 A | 4/1995 | DeChellis et al. | |
| 5,416,228 A | 5/1995 | Ewen et al. | |
| 5,427,991 A | 6/1995 | Turner | |
| 5,434,116 A | 7/1995 | Sone et al. | |
| 5,436,304 A | 7/1995 | Griffin et al. | |
| 5,449,651 A | 9/1995 | Reddy et al. | |
| 5,453,471 A | 9/1995 | Bernier et al. | |
| 5,455,317 A | 10/1995 | Reddy et al. | |
| 5,468,702 A | 11/1995 | Jejelowo | |
| 5,470,811 A | 11/1995 | Jejelowo et al. | |
| 5,491,205 A | 2/1996 | Langhauser et al. | |
| 5,496,902 A | 3/1996 | Evertz et al. | |
| 5,502,124 A | 3/1996 | Crowther et al. | |
| 5,516,861 A | 5/1996 | Jejelowo | |
| 5,527,868 A | 6/1996 | Evertz et al. | |
| 5,529,965 A | 6/1996 | Chang | |
| 5,536,796 A | 7/1996 | Jejelowo et al. | |
| 5,545,829 A | 8/1996 | Brekner et al. | |
| 5,635,573 A | 6/1997 | Harrington et al. | |
| 5,643,847 A | 7/1997 | Walzer, Jr. | |
| 5,747,405 A | 5/1998 | Little et al. | |
| 5,795,838 A | 8/1998 | Tsutsui et al. | |
| 5,814,574 A | 9/1998 | McNally | |
| 6,004,897 A | 12/1999 | Imuta et al. | |
| 6,297,333 B1 | 10/2001 | Imuta et al. | |
| 6,316,558 B1 | 11/2001 | Kaneko et al. | |
| 6,541,413 B1 * | 4/2003 | Razavi et al. | 502/152 |
| 6,759,499 B1 | 7/2004 | Floyd et al. | |
| 7,026,494 B1 | 4/2006 | Yang et al. | |

FOREIGN PATENT DOCUMENTS

| | | |
|---|---|---|
| EP | 0 596 553 A2 | 5/1994 |
| EP | 0 659 773 A1 | 6/1995 |
| EP | 0 912 618 | 5/1999 |
| JP | 08-024751 | 1/1996 |
| JP | 08-104691 | 4/1996 |
| JP | 10-226694 | 8/1997 |
| JP | 09-235313 | 9/1997 |
| WO | WO 92/00333 | 1/1992 |
| WO | WO 93/13140 | 7/1993 |
| WO | WO 94/03506 | 2/1994 |
| WO | WO 94/03509 A1 | 2/1994 |
| WO | WO 94/21962 | 9/1994 |
| WO | WO 94/28032 | 12/1994 |
| WO | WO 95/04087 | 2/1995 |
| WO | WO 95/07942 | 3/1995 |
| WO | WO 95/15815 | 6/1995 |
| WO | WO 96/00245 | 1/1996 |
| WO | WO 96/00246 | 1/1996 |
| WO | WO 96/08520 | 3/1996 |
| WO | WO 96/33227 | 10/1996 |

OTHER PUBLICATIONS

"Alkyl-substituted Zirconocenes As Components of a Catalytic System of Ethylene Polymerization," Mar'in, et al, Metalloorganicheskaya Khimiya (Organometallic Chemistry), vol. 3, No. 2, p. 473-474, (1990).

Kaminsky et al., *Metallocene Catalysis*, Applied Catalysis A: General 222, 2001, pp. 47-61.

Peacock, *Handbook of Polyethylene, Structures, Properties, and Applications*, 2000, Marcel Dekker, Inc., p. 260.

Beagley et al., *Chiral Metallocenes: The Synthesis and X-ray Crystal Structures of TiCl$_2$($\eta^5$ $\eta^5$ - C$_5$Me$_4$SiMe$_2$C$_5$H$_3$R\*)* (R\* = menthyl or neomenthyl) and Related Compounds, Can. J. Chem., 2001, vol. 79, pp. 731-741.

Cesarotti et al., *Synthesis of New Ligands for Transition Metal Complexes: Menthyl- and Neomentyl-cyclopentadienes*, Journal of Organometallic Chemistry, 1978, vol. 162, pp. 297-309.

Fletcher et al., Editors, *Nomenclature of Organic Compounds - Principles and Practice*, American Chemical Society Advances in Chemistry Series 126, 1974, pp. 23 and 26.

Morrison et al., *Organic Chemistry, Fourth Edition*, New York University, 1983, pp. 83 and 91.

\* cited by examiner

Fig. 1  Typical DSC Trace for Invention Catalyst
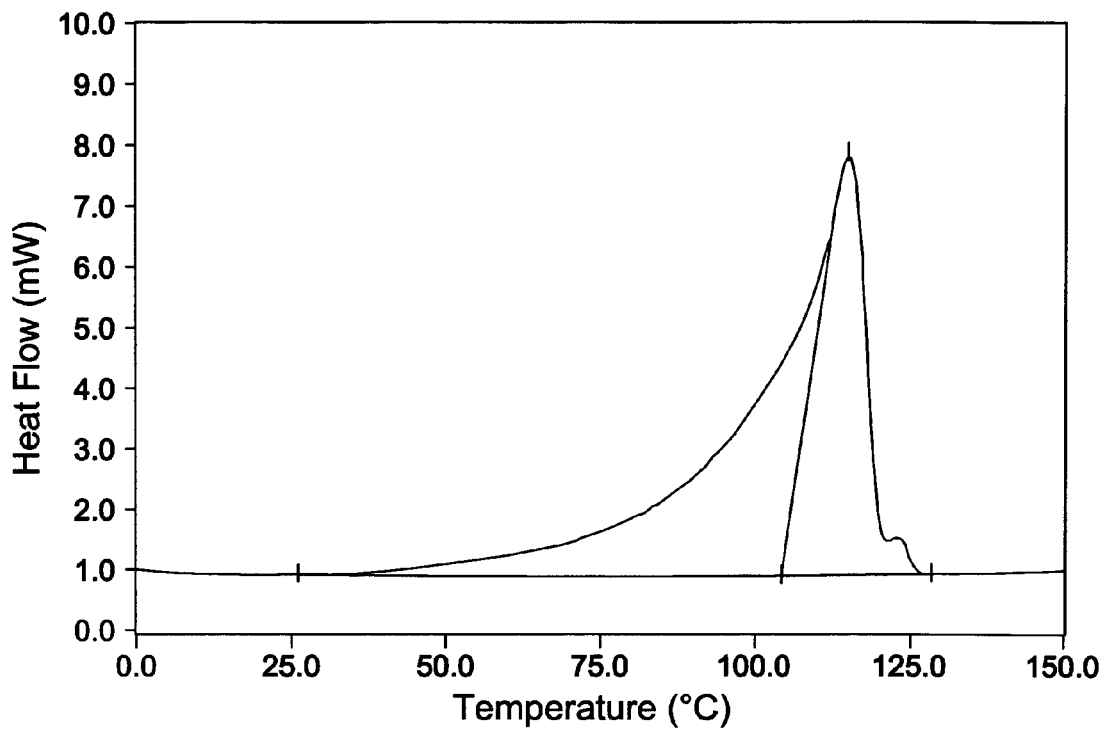
Fig. 2  Typical DSC Trace for Comparative Example
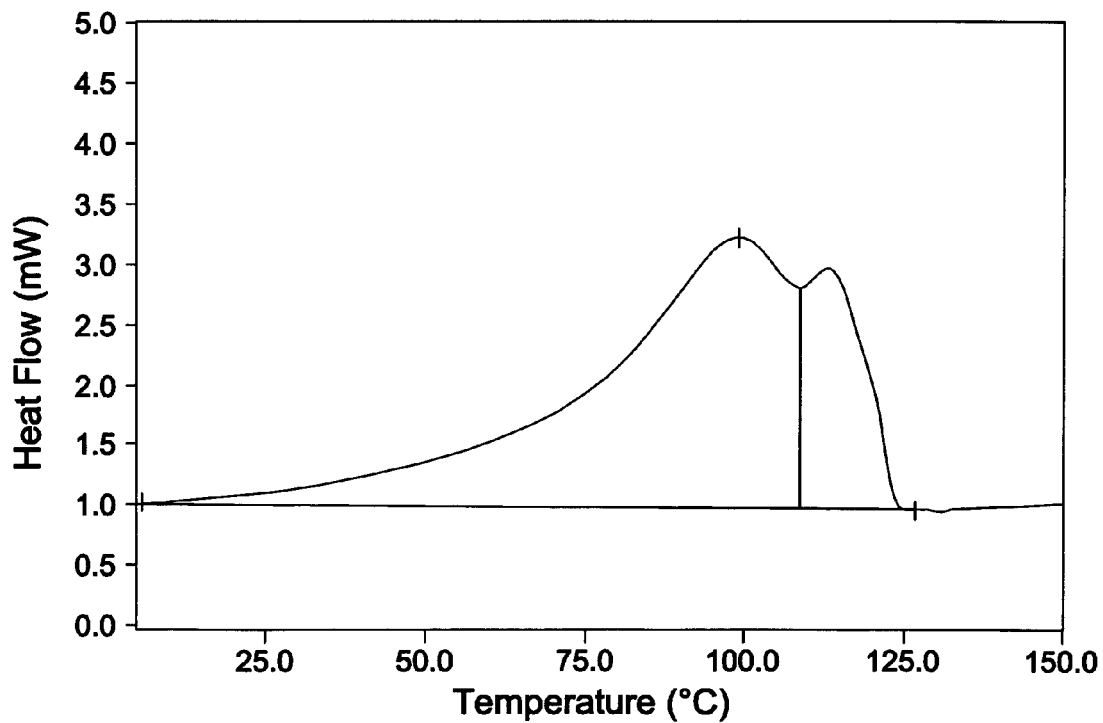

OLEFIN POLYMERIZATION PROCESS WITH ALKYL-SUBSTITUTED METALLOCENES

RELATED APPLICATIONS

This application is a divisional of U.S. patent application Ser. No. 10/127,984 filed Apr. 22, 2002, now U.S. Pat. No. 6,800,704, which is a divisional of U.S. patent application Ser. No. 09/615,296 filed Jul. 13, 2000, now U.S. Pat. No. 6,489,413, which is a divisional of U.S. patent application Ser. No. 09/400,568 filed Sep. 21, 1999, now U.S. Pat. No. 6,759,499, an application based on U.S. provisional application Ser. No. 60/021,841 filed Jul. 16, 1996.

FIELD OF THE INVENTION

The invention relates to a polymerization process for olefinically unsaturated monomers utilizing alkyl-substituent containing metallocenes to achieve polymer products having narrow composition distributions, low melt index ratios, and, optionally, high melt strength.

BACKGROUND OF THE INVENTION

The use of metallocene compounds in catalyst systems for the polymerization of olefinically unsaturated olefins is well known in the art. Metallocene compounds have been defined as organometallic coordination compounds obtained as a cyclopentadienyl derivative of a transition metal or metal halide. Three types are representative: biscyclopentadienyl Group 4 metal compounds, biscyclopentadienyl Group 5-10 metal compounds and monocyclopentadienyl Group 4 and 5 metal compounds. In these categories are included those having alkyl-substituents on one or both cyclopentadienyl rings, both bridged metallocenes and unbridged metallocenes where the bridging if present is between one cyclopentadienyl ring ligand and another, or one cyclopentadienyl ring ligand and a heteroatom ligand of the transition metal. Syntheses of these compounds are well known and typically comprise the reaction of one or more selected cyclopentadienide compound with a transition metal halide.

Metallocenes generally are capable of narrow molecular weight distributions (MWD) in view of their typically yielding single-site catalysts when activated. However, capabilities as to compositional distributions (CD) and melt index ratios (MIR) vary widely, particularly when the transition metal compounds are immobilized on particulate supports so as to form heterogeneous catalyst systems. Polymer products used in certain applications benefit from low MIR. The optical properties are improved when polymer fractions, typically comprised in the polymerization reaction product of any coordination polymerization catalysts, are as similar as possible. Additionally, narrow CD polymers typically have good optical properties, low levels of extractables and low blocking attributes. The narrow CD also is indicative of narrow melting point distribution which is of particular importance for film manufacturers.

Unbridged biscyclopentadienyl metallocene compounds having alkyl substituents said to be suitable for olefin polymerization, particularly heterogeneous polymerization process conditions, are described in U.S. Pat. No. 5,470,811. The catalysts comprise preferably at least two alkyl substituents on each and provide broad molecular weight distribution, high molecular weight and narrow composition distributions. Table II examples 11-13 illustrate the use of (1,3-Me-n-BuCp)$_2$ZrCl$_2$, (1,2-Me-n-BuCp)$_2$ZrCl$_2$ and (n-Pr-Cp)$_2$ZrCl$_2$ for copolymers having I$_{21}$/I$_2$ (defined as melt index ratio, MIR, measured in accordance with ASTM D-1238) values from 17.9 to 23.2 and MWD (M$_w$/M$_n$) values of from 2.5 to 3.7. Utility of the copolymers in film products and background for film preparation are disclosed. See also, WO 96/00246 for a description of multiply substituted cyclopentadienyl ring-containing metallocenes and their use in gas phase polymerization processes where low melt indices or high molecular weights are sought.

Bridged biscyclopentadienyl metallocenes useful for gas phase polymerization are disclosed in European Patent Application 0 659 773 A1. The cyclopentadienyl moieties may be substituted with one or more substituents R, the catalysts are said to be suitable for the production of long chain branch-containing polyethylene when used in the process described. Values for I$_{21}$/I$_2$ of 56 to 110 are illustrative of the invention, the comparative examples illustrate values of 37 to 47.

SUMMARY OF THE INVENTION

The invention comprises an olefin polymerization process comprising contacting ethylene alone or with one or more olefinically unsaturated comonomers with a Group 3-6 metallocene catalyst compound comprising one π-bonded ring having one or more C$_3$ or greater hydrocarbyl, hydrocarbylsilyl or hydrocarbylgermyl substituent, said substituent bonded to the ring through a primary carbon atom; and, 2) where a metallocene containing two π-bonded rings, the total number of substituents on the rings is equal to a number from 3 to 10, said rings being asymmetrically substituted where the number of substituents is 3 or 4. In a preferred embodiment compound containing two π-bonded rings, the rings are covalently bridged and a C$_3$ or greater hydrocarbyl, hydrocarbylsilyl or hydrocarbylgermyl substituent is at its ring 3 or 4 position with respect to the bridge. Where the metallocene contains only one π-bonded ring, it will preferably be bridged to a Group 15 or 16 heteroatom, said heteroatom preferably containing a 2° or 3° Group 14 atom containing hydrocarbyl, hydrocarbylsilyl or hydrocarbylgermyl substituent group of 1 to 20 non-hydrogen atoms. The term substituent when referring to those groups substituted on the rings includes essentially hydrocarbyl, hydrocarbylsilyl or hydrocarbylgermyl groups having from about 1 to 30 Group 14 atoms. Two adjacent ring substituent groups may be joined so as to form a fused ring system, for example, unsubstituted or further substituted indenyl, fluorenyl or azulenyl groups. The invention process is particularly suitable for preparing ethylene copolymers having an MIR less than about 35, preferably less than about 30, and for certain embodiments less than about 20, and narrow CD, such as those having a comonomer distribution breadth index (CDBI) equal to or above 60, even at high comonomer incorporation rates. Ethylene copolymers having improved melt strength while retaining the low MIR and narrow CD are also enabled by use of invention metallocene compounds containing two π-bonded rings covalently bridged to each other, with the C$_3$ or greater hydrocarbyl, hydrocarbylsilyl or hydrocarbylgermyl substituent being bonded at the 3 or 4 position on one of the rings, where the ring carbon covalently bonded to the bridge is counted as the 1 position.

BRIEF DESCRIPTION OF THE FIGURES

FIG. 1 is a Differential Scanning Calorimetry (DSC) measurement of polymer made according to the invention in Example 1.

FIG. 2 is a comparative DSC measurement of polymer made with a catalyst of the prior art. A comparison of the figures illustrates the narrow melting point distribution achieved using the invention catalyst exemplified.

DETAILED DESCRIPTION OF THE INVENTION

The preferred Group 4 catalyst compounds comprising one π-bonded ring can be represented by the formula:

$$L^A L^B L^C_i MAB, \quad (1)$$

where $L^A L^B L^C_i$ MAB is the invention transition metal metallocene compound. More specifically, $L^A$ is a substituted cyclopentadienyl or heterocyclopentadienyl ancillary ligand π-bonded to M; $L^B$ can be a member of the class of ancillary ligands defined for $L^A$, or can be J, a heteroatom ancillary ligand σ-bonded to M; the $L^A$ and $L^B$ ligands may be covalently bridged together through a Group 14 element linking group, preferably the Group 14 element being carbon or silica; $L^C_i$ is an optional neutral, non-oxidizing ligand having a dative bond to M (typically i equals 0 to 3); M is a Group 4 transition metal; and, A and B are independently monoanionic labile ligands, each having a σ-bond to M which can be broken for abstraction purposes, optionally bridged to each other or $L^A$ or $L^B$, by a suitable activator and into which a polymerizable monomer or macromonomer can insert for coordination polymerization, or are ligands which can be converted to such; wherein at least one of $L^A$ or $L^B$ has at least one $C_3$ or greater hydrocarbyl, hydrocarbylsilyl or hydrocarbylgermyl substituent bonded to the ring through a primary carbon atom.

Either of $L^A$ or $L^B$ may be a cyclopentadienyl-group containing ring which is substituted with from two to five substituent groups R. When both are cyclopentadienyl-group containing rings, $L^A$ or $L^B$ may be a cyclopentadienyl ring with one substituent and the other a substituted cyclopentadienyl ring with two or more substituents. Each substituent group R is, independently, a radical selected from hydrocarbyl, hydrocarbylsilyl or hydrocarbylgermyl having from 1 to 20 carbon, silicon or germanium atoms, substituted hydrocarbyl, hydrocarbylsilyl or hydrocarbylgermyl radicals as defined wherein one or more hydrogen atoms is replaced by a halogen radical, an amido radical, a phosphido radical, an alkoxy radical, an aryloxy radical or any other radical containing a Lewis acidic or basic functionality; $C_1$ to $C_{20}$ hydrocarbyl-substituted metalloid radicals wherein the metalloid is selected from the Group IV A of the Periodic Table of Elements; halogen radicals; amido radicals; phosphido radicals; alkoxy radicals; or alkylborido radicals; or, may be a cyclopentadienyl ring in which at least two adjacent R-groups are joined together and along with the carbon atoms to which they are attached form a $C_4$ to $C_{20}$ ring system which may be saturated, partially unsaturated or aromatic, and substituted or unsubstituted, the substitution being of one or more R groups as defined above.

Either or both of $L^A$ or $L^B$ may similarly be a heterocyclopentadienyl ancillary ligand π-bonded to M. The term "heterocyclopentadienyl" means here a 5-member ring analogous to a cyclopentadiene ring wherein at least one carbon atom at any position in the ring has been replaced with a non-carbon Group 14 or 15 element. Preferably the non-carbon elements are selected from the group consisting of germanium, silicon, nitrogen or phosphorous. The Group 14 or Group 15 heterocyclopentadienyl moieties are analogous to a cyclopentadienyl moiety which possesses a formal charge −1, making it formally a monoanionic ligand. And, though cyclopentadienyl rings are typically described as being "eta-5" bonded to the transition metal in metallocenes, other forms of π-bonding, eta-3 through eta-4, may additionally be possible with the Group 14 or 15 heterocyclopentadienyl ligands of the invention and thus are included within the scope of the invention. Such heterocyclopentadienyl ligands are addressed in U.S. Pat. No. 5,434,116, International publication WO 95/04087, Japanese application 08-24751 and co-pending application U.S. Ser. No. 60/041,258 filed Mar. 17, 1997, each is incorporated by reference for purposes of U.S. patent practice.

The $C_3$ or greater hydrocarbyl, hydrocarbylsilyl or hydrocarbylgermyl substituent bonded to either the $L^A$ or $L^B$ ring through a primary carbon atom is preferably an n-alkyl substituent, such as, n-propyl, n-butyl, n-pentyl, n-dodecyl, etc. Substituents having a primary carbon attached to the ring may be branched after that carbon, examples include 2-ethylbutyl, 2-methylpropyl, 2-cyclohexylethyl, and benzyl. The primary carbon-containing substituent is attached to either of the $L^A$ or $L^B$ rings and is preferably the only substituent on the ring to which it is attached, or is the substituent with the greatest number of non-hydrogen atoms. Additionally, for invention compounds containing a Group 14 atom-containing bridging group between the $L^A$ and $L^B$ rings, the $C_3$ or greater, primary carbon-containing substituent of the invention is preferably located at the 3 or 4 position, counting from the atom in the ring covalently bonded to the bridge, preferably the 3 position.

J as referred to above is a Group 15 or 16 heteroatom which may be substituted with one R' group when J is a group 15 element and J is covalently bridged to $L^A$, or with two R' groups when J is a group 15 element and J is not covalently bridged to $L^A$, or is unsubstituted when J is a Group 16 element and J is covalently bridged to $L^A$, and each substituent group R' is, independently, a radical selected from: hydrocarbyl, hydrocarbylsilyl or hydrocarbylgermyl radicals having 1 to 30 carbon, silicon or germanium atoms; substituted hydrocarbyl, silyl-hydrocarbyl or germyl-hydrocarbyl radicals as defined wherein one or more hydrogen atoms is replaced by a $C_{1-20}$ hydrocarbyl radical, halogen radical, an amido radical, a phosphido radical, an alkoxy radical, or an aryloxy radical; halogen radicals; amido radicals; phosphido radicals; alkoxy radicals; or alkylborido radicals. A preferred J group when unbridged to $L^A$ is one where each R' is independently a bulky substituent such as tert-butyl or trimethyl silyl, see copending application U.S. application Ser. No. 08/833,146, filed Apr. 4, 1997, and filed internationally as PCT/US96/17224, incorporated by reference for purposes of U.S. patent practice.

The term "asymmetric" as applied for two $L^A$ and $L^B$ rings means, for the purposes of this description and the claims derived therefrom, the number or type of ring substituents on the $L^A$ and $L^B$ rings is different. Thus for certain embodiments of the invention metallocene catalyst compound containing two π-bonded rings and a total number of substituents on the rings equal to 3, two generally defined substituents can be on $L^A$ and the primary carbon-containing substituent of the invention then is on the $L^B$ ring. For certain embodiments of the invention metallocene catalyst compound containing two π-bonded rings and a total number of substituents on the rings equal to 4, three generally defined substituents can be on $L^A$ and the primary carbon-containing substituent of the invention is on the $L^B$ ring. Preferred illustrative embodiments include: (tetramethyl-cyclopentadienyl)(n-propyl-cyclopentadienyl)zirconium dichloride or dimethyl, (pentamethyl-cyclopentadienyl)(n-propyl-cyclopentadienyl)zirconium dichloride or dimethyl, (tetramethyl-cyclopentadienyl)dimethylsilyl(3-n-propyl-cyclopentadienyl)zirconium dichloride or dimethyl, (tetrahydroindenyl)dimethylsilyl(3-n-propyl-cyclopentadienyl)zirconium dichloride or dimethyl, (tetramethyl-cyclopentadienyl)dimethylsilyl(2-methyl-4-n-propylcyclopentadienyl)zirconium dichloride or dimethyl, (indenyl)isopropylidene(3-n-propyl-cyclopentadienyl)zirconium dichloride or dimethyl, (indenyl)dimethylsilyl(3-n-propyl-cyclopentadienyl)hafnium dichloride or dimethyl, (1,3-dimethyl-cyclopentadienyl)(n-butyl-cyclopentadienyl)zirconium dichloride or dimethyl, (tetramethyl-3-n-propylcyclopentadienyl)(cyclopentadienyl)zirconium dichloride or dimethyl, (1-methyl-2-n-butylcyclopentadienyl)(methylcyclopentadienyl)zirconium dichloride or dimethyl, (1-methyl-3-ethylcyclopentadienyl)(1-methyl-3-n-propylcyclopentadienyl)zirconocene, (1,2,4-trimethyl-3,5-di-n-butylcyclopentadienyl)zirconium dichloride or dimethyl, (1-n-butylindenyl)(4-phenylindenyl)zirconium dichloride or dimethyl and (indenyl)dimethylsilyl(3-n-propyl-cyclopentadienyl)hafnium dichloride or dimethyl. In general methyl groups are the preferred complementary ring substituents for both the bridged and unbridged embodiments, that is in addition to the a $C_3$ or greater substituent bonded to one ring through a primary carbon atom. Where fused rings are part of the ring substitution pattern each such fused ring is counted as two substituents on its respective cyclopentadienyl ring. Thus indenyl ligands are considered to be cyclopentadienyl rings having two substituents and fluorenyl ligands are considered to be cyclopentadienyl rings having four substituents. Additional substituents on the fused rings are not independently counted in determining the number of substituents on the cyclopentadienyl ring, but are taken into consideration in determining asymmetry.

The catalyst compounds described above are suitable for olefin polymerization in accordance with known polymerization processes for which art-recognized metallocene catalysts have been shown to be suitable. The patent art with respect to both monocyclopentadienyl and biscyclopentadienyl catalysts will be instructive. See, for example, U.S. Pat. Nos. 5,198,401, 5,324,800, 5,502,124, 5,635,573, 5,536,796 and International publications WO 92/00333 and WO 96/33227. Generally speaking, the polymerization process comprises contacting one or more olefinically unsaturated monomers with an activated catalyst compound of the invention, activation occurring by reaction or interaction with a cocatalyst activator compound suitable for activation of known metallocene compounds into active, insertion polymerization catalyst compounds. The teachings as to olefin polymerization in the references above are incorporated by reference for purposes of U.S. patent practice. As is well-known in the art, suitable polymerizable olefins include α-olefins containing 2 or more carbon atoms, preferably $C_2$ to $C_8$ α-olefins, cyclic olefins, preferably norbornene or alkyl-substituted norbornenes, non-conjugated diolefins, and vinyl aromatic monomers, preferably styrene and alkyl-substituted styrene monomers. Additionally, when the invention metallocene contains only one π-bonded ring bridged to a Group 15 or 16 heteroatom, geminally disubstituted olefins, such as isobutylene, will be polymerizable in accordance with the teachings of U.S. application Ser. No. 08/651,030, filed on May 21, 1996, incorporated by reference for purposes of U.S. patent practice.

The catalysts according to the invention are particularly suited to use in known gas phase or slurry copolymerization processes where heterogeneous catalysts are typically used. The heterogeneous catalysts of the invention are typically supported on inert support particles, which may be formed from inorganic refractory oxide or polymeric materials, which are then used in a gas phase or liquid process wherein the monomers are contacted with the supported catalysts. The teachings and descriptions of the background art are incorporated by reference for purposes of U.S. patent practice and are specific to process conditions and reagents useful with the catalyst system of this invention.

For olefin polymerization, the metallocene compounds of the invention may be activated by use of the traditional activation cocatalysts, specifically including the use of alkyl aluminum compounds, alkyl alumoxane compounds and any ionizing activators, such as those represented by aryl-substituted boron compounds, e.g., nitrogen-containing salts, carbenium or phosphonium salts, metal salts and neutral Lewis acid compounds. Each activation method is well-documented in the field of metallocene art. Related means of activation, such as the use of alkyl aluminum alkylation agents used to convert metallocene halide compounds to hydride or alkyl group-containing compounds prior to activation with the ionic activator compounds will be suitable in accordance with the inventions. Additionally, the use of supported activators, where such are stable compounds, will be suitable in accordance with the invention for both activation and support. See, for example, U.S. Pat. Nos. 5,427,991 and 5,643,847, each of which is incorporated by reference for purposes of U.S. patent practice.

The use of organometallic compounds as scavenging compounds in the olefin polymerization processes of the invention will also be suitable. Alkyl aluminum compounds such as triethyl aluminum, triisobutyl aluminum, tri-n-octyl aluminum, methylalumoxane and isobutylalumoxane are well-known in the art.

Suitable gas phase processes are illustrated U.S. Pat. Nos. 4,543,399, 4,588,790, 5,028,670, 5,352,749, 5,382,638, 5,405,922, 5,422,999, 5,436,304, 5,453,471, and 5,463,999, and International applications WO 94/28032, WO 95/07942 and WO 96/00245. Each is incorporated by reference for purposes of U.S. patent practice. Typically the processes are conducted at temperatures of from about −100° C. to 150° C., preferably from about 40° C. to 120° C., at pressures up to about 7000 kPa, typically from about 690 kPa to 2415 kPa. Continuous processes using fluidized beds and recycle streams as the fluidizing medium are preferred.

Slurry polymerization processes in which the immobilized catalyst systems of this invention may be used are typically described as those in which the polymerization medium can be either a liquid monomer, like propylene, or a hydrocarbon solvent or diluent, advantageously aliphatic paraffin such as propane, isobutane, hexane, heptane, cyclohexane, etc. or an aromatic one such as toluene. The polymerization temperatures may be those considered low, e.g., less than 50° C., preferably 0-30° C., or may be in a higher range, such as up to about 150° C., preferably from 50° C. up to about 80° C., or at any ranges between the end points indicated. Pressures can vary from about 100 to about 700 psia (0.76-4.8 MPa. Additional description is given in U.S. Pat. Nos. 5,274,056 and 4,182,810 and WO 94/21962 which are incorporated by reference for purposes of U.S. patent practice.

The immobilized catalyst systems of the invention may be prepared by any effective method of supporting other coordination catalyst systems, effective meaning that the catalyst so prepared can be used for preparing polymer in a heterogeneous polymerization process. Preferred methods include those referred to in copending U.S. application Ser. No. 08/466,547, filed 6 Jun. 1995, and in its counterpart WO 96/00245. In accordance with this method, as illustrated in the examples below, the transition metal compound is combined with an activator compound in solvent to prepare a precursor solution which is added to a porous support particle in such a manner that the total solvent volume exceeds the total particle pore volume but is less than that at which the formation of a slurry is observed.

The activated catalyst may also be supported in accordance with WO 91/0882 and WO 94/03506, particularly when using ionizing activators providing electronically stabilizing non-coordinating anions. In this method, inorganic oxide particle supports are treated with a Lewis acid to neutralize any hydroxyl groups remaining on the surfaces after thorough drying and prior to the adsorption of the activated catalyst complex from the solution in which it is added.

The support method of Example 11-16 in copending U.S. application Ser. No. 08/549,991, filed 30 Oct. 1995, and in WO 96/08520 will also be suitable in accordance with this invention.

Additional methods appear in the following descriptions for metallocene catalysts, these methods will be suitable as well for the invention catalyst systems. U.S. Pat. No. 4,937,217 generally describes a mixture of trimethylaluminum and triethylaluminum added to an undehydrated silica to which a metallocene catalyst component is then added. EP-308177-B1 generally describes adding a wet monomer to a reactor containing a metallocene, trialkylaluminum and undehydrated silica. U.S. Pat. Nos. 4,912,075, 4,935,397 and 4,937,301 generally relate to adding trimethylaluminum to an undehydrated silica and then adding a metallocene to form a dry supported catalyst system. U.S. Pat. No. 4,914,253 describes adding trimethylaluminum to undehydrated silica, adding a metallocene and then drying the resulting supported catalyst system with an amount of hydrogen to produce a polyethylene wax. U.S. Pat. Nos. 5,008,228, 5,086,025 and 5,147,949 generally describe forming a dry supported catalyst system by the addition of trimethylaluminum to a water impregnated silica to form alumoxane in situ and then adding the metallocene. U.S. Pat. Nos. 4,808,561, 4,897,455 and 4,701,432 describe techniques to form a supported catalyst where the inert carrier, typically silica, is calcined and contacted with a metallocene(s) and an activator/cocatalyst component. U.S. Pat. No. 5,238,892 describes forming a dry supported catalyst system by mixing a metallocene with an alkyl aluminum and then adding undehydrated silica. U.S. Pat. No. 5,240,894 generally pertains to forming a supported metallocene/alumoxane catalyst system by forming a metallocene/alumoxane reaction solution, adding a porous carrier, and evaporating the resulting slurry to remove residual solvent from the carrier.

Polymeric carriers will also be suitable in accordance with the invention, see for example the descriptions in WO 95/15815 and U.S. Pat. No. 5,427,991. As taught for metallocene catalysts in these documents, the catalyst complexes of this invention may be either adsorbed or absorbed, on the polymeric supports, particularly if made up of porous particles, or may be chemically bound through functional groups covalently bound to or in the polymer chains.

Suitable solid particle supports are typically comprised of polymeric or refractory oxide materials, each being preferably porous. any support material, preferably a porous support material, such as for example, talc, inorganic oxides, inorganic chlorides, for example magnesium chloride and resinous support materials such as polystyrene polyolefin or polymeric compounds or any other organic support material and the like that has an average particle size preferably greater than 10 µm.

The preferred support materials are inorganic oxide materials, which include those from the Periodic Table of Elements of Groups 2, 3, 4, 5, 13 or 14 metal or metalloid oxides. In a preferred embodiment, the catalyst support materials include silica, alumina, silica-alumina, and mixtures thereof. Other inorganic oxides that may be employed either alone or in combination with the silica, alumina or silica-alumina are magnesia, titania, zirconia, and the like.

It is preferred that the carrier of the catalyst of this invention has a surface area in the range of from about 10 to about 700 $m^2/g$, pore volume in the range of from about 0.1 to about 4.0 cc/g and average particle size in the range of from about 10 to about 500 µm. More preferably, the surface area is in the range of from about 50 to about 500 $m^2/g$, pore volume of from about 0.5 to about 3.5 cc/g and average particle size of from about 20 to about 200 µm. Most preferably the surface area range is from about 100 to about 400 $m^2/g$, pore volume from about 0.8 to about 3.0 cc/g and average particle size is from about 30 to about 100 µm. The pore size of the carrier of the invention typically has pore size in the range of from 10 to 1000 Angstroms, preferably 50 to about 500 Angstroms, and most preferably 75 to about 350 Angstroms.

The above documents typically discuss specific methods of supporting metallocene catalysts. Generally the procedures that follow will be suitable. An aluminoxane, such as methylalmoxane or modified alumoxane, or other suitable cocatalyst activator such as $Al(CH_3)_3$, $Al(CH_2CH_3)_2Cl$, $B(C_6F_5)_3$, $[C_6H_5NMe_2H]+[B(C_6F_5)_4]-$, $[(C_6H_5)_3C]+[B(C_6F_5)_4]-$, $[H]+[PF_6]-$, $[Ag]+[BF_4]-$, $[Ag]+[PF_6]+$, or $[Ag]+[B(C_6F_5)_4]-$ is combined with one or more transition metal complexes in an appropriate solvent to form a precursor solution. A suitable support, preferably porous, is charged to a vessel and the precursor solution is added with stirring. The mixture may be mixed by hand with a spatula, by a rotating stirrer with wire loops such as a Kitchen Aid dough mixer, by metal blades rotating at high speed such as in a Wehring blender, by a helical ribbon bladed mixer, by shaking, tumbling, fluidized bed mixing, by paddle or propeller blades on a rotating stir shaft, or other appropriate means. The total amount of solvent used to form the precursor suspension or solution may be less than the pore volume of the support as in impregnation to incipient wetness, or greater than the pore volume of the support such that a slurry is formed, or an amount in between such that a solution-finely divided support mixture is neither free flowing nor a slurry. Solution may be added to support or vice versa as appropriate to the mixing method. If desired the liquids may be removed by purging with an inert gas or under vacuum.

The products of the polymerization processes described above, using the invention catalyst compounds, are typically those having narrow composition distribution (CDBI≧60) with melt index ratios less than about 35, preferably 30 and more preferably less than about 25. The MWD ($M_w/M_n$) can range from about 2-15, preferably 2-10, and even 2.5-5. Where greater than about 4.5, melt processing of the copolymer products are improved, where less than 4.5 both of less clarity and less uniformity of end products are improved. The molecular weight, as expressed in terms of its polyethylene melt index (MI; 2.16 $kg/cm^2$, 190° C., ASTM D 1238) will typically range from 0.2 to 10 as determined by specific catalyst choice and selection of known operating polymerization conditions such as hydrogen addition and polymerization temperature. It has been additionally observed that ethylene copolymers having high melt strength (MS; ≧6.0–6.0×log (MI), preferably ≧8.0–6.0×log(MI)) are made possible with certain catalysts of the invention, this being particularly surprising in that high melt index ratios (MIR; $I_{21}/I_2$) values (e.g., ≧35) previously had been thought to be a necessary parameter for achieving high values of melt strength. As illustrated in example 14 below, bridged, biscyclopentadienyl catalyst compounds according to the invention can yield a surprising combination of low MIR and high melt strength.

This combination results in improved bubble strength for blown film and reduced problems with "neck in" for cast or extruded film without the expected significant reduction of film toughness typically observed with ethylene polymers having high MIR and high MS.

The polymer characterizations presented in this application were conducted under the following conditions and procedures. MI was determined as described above. MIR is described as the ratio of the $I_{21}$ to $I_2$ in accordance with ASTM D-1238. All of $M_w$, $M_n$, and $M_w/M_n$ (MWD) were determined by gel permeation chromatography (GPC) using a DRI differential refraction index detector, i.e., a Waters 150C GPC instrument with DRI detectors. CDBI was determined in accordance with the method described in columns 7 and 8 of WO 93/03093. Melt strength was determined using a Gottfert Rheotens Melt Strength apparatus measuring at 190° C. in conjunction with an Instron Capillary Rheometer. The capillary die was set at 0.6 in. diameter×1 in. length and the extrudate rate was set at the die exit at 3 in./min. The take off gears of the apparatus were set at 100 mm from the die exit. The take-up speed for the extrudate was progressively increased in accordance with the program of an Acceleration Programmer Model 459117 at a setting of 12. Density was measured in accordance with ASTM d-1505. The Average Particle Size (APS) was measured by determining the weight of material collected on a series of U.S. Standard sieves and determining the weight average particle size in micrometers based on the sieve series used.

EXAMPLES

I. Unbridged Biscyclopentadienyl Catalyst Systems

Example 1 (Invention)

(n-propylcyclopentadienyl)(pentamethylcyclopentadienyl)zirconium dichloride

Metallocene Synthesis

Pentamethylcyclopentadienyl zirconium trichloride (25 g, 75 mmol) was dissolved in 200 cm³ of a 50:50 mixture of toluene and tetrahydrofuran. The reaction flask was equipped with a mechanical stirrer and cooled to −78° C. 75 cm³ of 1.0 M solution of sodium-n-propylcyclopentadienide (corresponding to 75 mmol n-propylcyclopentadiene) in toluene/tetrahydrofuran was then added slowly using a pressure-equilibrated addition funnel. The reaction was allowed to continue over 16 hours while the temperature warmed to 22° C. The solvent was then removed under reduced pressure at 45° C. The resulting crude product was extracted repeatedly with hexane. The hexane extracts were concentrated and the pure title compound was precipitated out at −34° C. The purity of the compound was confirmed with ¹H-NMR (500 MHz).

Preparation of Supported Catalyst.

a) Methylalumoxane (1091 cm³ of 30 wt-% solution in toluene) was charged into a 2-gallon reaction vessel. 1576 cm³ of fresh toluene was added. Then a 10 wt-% solution of 14.8 g of (n-propylcyclopentadienyl)(pentamethylcyclopentadienyl)zirconium dichloride in toluene was added. The temperature was maintained at 27° C. and the mixture stirred for 1 hour.

b) 800 g of a Davison 948 sample dehydrated at 600° C. was charged into a 2-gallon reaction vessel at 27° C. The solution of methylalumoxane and metallocene from above was added onto the silica in two equal portions. Then an additional 450 cm³ toluene was added to the slurry. After 20 minutes, a solution of 5.7 g of N,N-bis(2-hydroxylethyl) octadecylamine in 50 cm³ toluene was added and stirring continued for another 30 minutes. The final catalyst was then dried to free-flowing powder at 80° C. under vacuum.

Polymerization

The supported catalyst described above was then tested in a pilot plant. The catalyst was fed continuously into a fluid bed gas-phase pilot plant reactor (internal diameter of 16¼ inches) maintained at 85° C. and 300 psig total reactor pressure. The product was withdrawn continuously through a product discharge outlet to maintain a constant bed height in the reactor. The composition of the gas phase, and operating conditions for the reactor, are summarized in Table I below.

Example 2

(n-propylcyclopentadienyl)-(pentamethylcyclopentadienyl)zirconium dichloride)

550 g of a Davison 948 sample dehydrated at 200° C. was charged into a 2-gallon reaction vessel at 27° C. 1280 cm³ of a 30 wt-% methylalumoxane solution in toluene was added followed by 1500 cm³ fresh toluene. The temperature was then raised to 68° C. and stirring continued for 4 hours. 26.7 g of (n-propylcyclopentadienyl)-(pentamethylcyclopentadienyl)zirconium dichloride in 100 cm³ toluene was then added and stirring continued for an additional 2 hours. The final catalyst was dried to free-flowing powder under vacuum at 68° C.

The supported catalyst was used in the polymerization of ethylene with 1-hexene in a gas-phase pilot unit as described in example 1 except that triethylaluminum was used as scavenger during the polymerization. The results are shown in Table I below.

Comparative Example 3

(bis(n-propylcyclopentadienyl)zirconium dichloride)

Preparation of Supported Catalyst a) Methylalumoxane (1070 cm³ of 30 wt-% solution in toluene) was charged into a 2-gallon reaction vessel. 1611 cm³ of fresh toluene was added. Then a 10 wt-% solution of 13.5 g of bis(n-propylcyclopentadienyl)zirconium dichloride in toluene was added. The temperature was maintained at 27° C. and the mixture stirred for 1 hour.

b) 800 g of a Davison 948 sample dehydrated at 600° C. was charged into a 2-gallon reaction vessel at 27° C. The solution of methylalumoxane and metallocene from above was added onto the silica in two equal portions. Then an additional 450 cm³ toluene was added to the slurry. After 20 minutes, a solution of 5.7 g of N,N-bis(2-hydroxylethyl) octadecylamine in 50 cm³ toluene was added and stirring continued for another 30 minutes. The final catalyst was then dried to free-flowing powder at 80° C. under vacuum.

Polymerization

The supported catalyst was used in the polymerization of ethylene with 1-hexene in a gas-phase pilot unit as described in example 1. The results are shown in Table I below. Though illustrating low MIR polymer products, the comparison of FIGS. 1 and 2 illustrate that the polymer of Ex. 3 has a dual melting point peak instead of the single melting point peak of the polymers from the invention catalysts. The second melt DSC traces of FIGS. 1 and 2 were obtained on a Perkin-Elmer instrument using ASTM D3417-83 standard procedures.

TABLE I

| Example | 1 | 2 | 3 (C) |
|---|---|---|---|
| Ethylene (mol-%) | 50 | 50 | 49.6 |
| 1-Hexene (mol-%) | 1.97 | 0.89 | 1.20 |
| Hydrogen (ppm) | 100 | 126 | 279 |
| Nitrogen | balance | balance | balance |
| Catalyst Productivity (g/g) | 4302 | 3720 | 9193 |
| Melt Index ($I_2$) | 1.02 | 2.33 | 2.81 |
| Melt Index Ratio (MIR) ($I_2/I_{21}$) | 15 | 20.9 | 18 |
| Resin Density | 0.9162 | 0.9220 | 0.9124 |
| Polymer APS (μm) | 910 | 579 | 1181 |

Example 4 (Invention)

(n-propylcyclopentadienyl)(pentamethylcyclopentadienyl)zirconium dichloride

Preparation of Supported Catalyst a) Methylalumoxane (1361 cm³ of 30 wt-% solution in toluene) was charged into a 2-gallon reaction vessel. 1970 cm³ of fresh toluene was added. Then a solution of 18.5 g of (n-propylcyclopentadienyl)(pentamethylcyclopentadienyl)zirconium dichloride in 335 cm³ toluene was added. The temperature was maintained at 27° C. and the mixture stirred for 1 hour.

b) 1000 g of a Davison 948 sample dehydrated at 600° C. was charged into a 2-gallon reaction vessel at 27° C. The solution of methylalumoxane and metallocene from above was added onto the silica in two equal portions. Then an additional 250 cm³ toluene was added to the slurry. After 20 minutes, a solution of 6.8 g of N,N-bis(2-hydroxyethyl)octadecylamine in 70 cm³ toluene was added and stirring continued for another 20 minutes. The final catalyst was then dried to free-flowing powder at 68° C. under vacuum.

Polymerization

The catalyst was then tested for ethylene/1-hexene copolymerization in a continuous fluid bed gas-phase reactor operated at 300 psig total pressure, 79.4° C. reactor temperature, and 1.6 ft/s cycle gas velocity. The catalyst was fed at a rate that maintained a constant rate of product discharge from the reactor. The reactor gas mixture was composed of 35% ethylene, 1.08% 1-hexene and 90 ppm $H_2$. Sample was collected after 5 bed-turnovers and analyzed for properties shown in Table II below.

Example 5 (Invention)

(n-butylcyclopentadienyl)(pentamethylcyclopentadienyl)zirconium dichloride

Preparation of Supported Catalyst

A solution of methylalumoxane (MAO) and metallocene was formed by adding 55 cm³ of 30 wt-% MAO solution in toluene onto 0.895 g of (n-butylcyclopentadienyl)(pentamethylcyclopentadienyl)zirconium dichloride in a vial. 120 cm³ of fresh toluene was added, and the mixture stirred for 45 minutes at 25° C. This pre-mixed solution of the MAO and the metallocene was then added onto 40 g of Davison 948 silica dried to 600° C. The resulting slurry was stirred for 1 hour at 25° C. Then a solution of 0.28 g of N,N-bis(2-hydroxyethyl)octadecylamine in 20 cm³ toluene was added, and stirring continued for another 30 minutes. The final catalyst was then dried to free-flowing powder under vacuum at 65° C.

Polymerization

The catalyst was then tested for ethylene/1-hexene copolymerization in the continuous fluid bed gas-phase reactor of example 4 operated at 300 psig total pressure, 79.4° C. reactor temperature, and 1.6 ft/s cycle gas velocity. The catalyst was fed at a rate that maintained a constant rate of product discharge from the reactor. The reactor gas mixture was composed of 35% ethylene, 1.08% 1-hexene and 84 ppm $H_2$. Sample was collected after 5 bed-turnovers and analyzed for properties shown in Table II below.

Example 6 (Comparative)

(methylcyclopentadienyl)(pentamethylcyclopentadienyl)zirconium dichloride

Preparation of Supported Catalyst

A solution of methylalumoxane (MAO) and metallocene was formed by adding 27 cm³ of 30 wt-% MAO solution in toluene onto 0.343 g of (methylcyclopentadienyl)(pentamethylcyclopentadienyl)zirconium dichloride in a vial. 100 cm³ of fresh toluene was added, and the mixture stirred for 45 minutes at 25° C. This pre-mixed solution of the MAO and the metallocene was then added onto 20 g of Davison 948 silica dried to 600° C. The resulting slurry was stirred for 1 hour at 25° C. Then a solution of 0.15 g of N,N-bis(2-hydroxyethyl)octadecylamine in 20 cm³ toluene was added, and stirring continued for another 30 minutes. The final catalyst was then dried to free-flowing powder under vacuum at 65° C.

Polymerization

The catalyst was then tested for ethylene/1-hexene copolymerization in the above continuous fluid bed gas-phase reactor operated at 300 psig total pressure, 76.7° C. reactor temperature, and 0.66 ft/s cycle gas velocity. The catalyst was fed at a rate that maintained a constant rate of product discharge from the reactor. The reactor gas mixture was composed of 35% ethylene, 1.13% 1-hexene and 147 ppm $H_2$. Sample was collected after 5 bed-turnovers and analyzed for properties shown in Table II below.

Example 7 (Invention)

(n-propylcyclopentadienyl)(tetramethylcyclopentadienyl)zirconium dichloride

Preparation of Supported Catalyst a) Methylalumoxane (1361 cm³ of 30 wt-% solution in toluene) was charged into a 2-gallon reaction vessel. 1970 cm³ of fresh toluene was added. Then a solution of 18.0 g of (n-propylcyclopentadienyl)(tetramethylcyclopentadienyl)zirconium dichloride in 335 cm³ toluene was added. The temperature was maintained at 27° C. and the mixture stirred for 1 hour.

b) 1000 g of a Davison 948 sample dehydrated at 600° C. was charged into a 2-gallon reaction vessel at 27° C. The solution of methylalumoxane and metallocene from above was added onto the silica in two equal portions. Then an additional 250 cm³ toluene was added to the slurry. After 20 minutes, a solution of 6.8 g of N,N-bis(2-hydroxyethyl)octadecylamine in 70 cm³ toluene was added and stirring continued for another 20 minutes. The final catalyst was then dried to free-flowing powder at 68° C. under vacuum.

Polymerization

The catalyst was then tested for ethylene/1-hexene co-polymerization in a the above continuous fluid bed gas-phase reactor operated at 300 psig total pressure, 79.4° C. reactor temperature, and 1.6 ft/s cycle gas velocity. The catalyst was fed at a rate that maintained a constant rate of product discharge from the reactor. The reactor gas mixture was composed of 35% ethylene, 0.87% 1-hexene and 103 ppm $H_2$. Sample was collected after 5 bed-turnovers and analyzed for properties shown in Table II below.

Example 8 (Comparative)

(cyclopentadienyl)(tetramethylcyclopentadienyl) zirconium dichloride

Preparation of Supported Catalyst

A solution of methylalumoxane (MAO) and metallocene was formed by adding 27 $cm^3$ of 30 wt-% MAO solution in toluene onto 0.317 g of (cyclopentadienyl)(tetramethylcyclopentadienyl)zirconium dichloride in a vial. 100 $cm^3$ of fresh toluene was added, and the mixture stirred for 45 minutes at 25° C. This pre-mixed solution of the MAO and the metallocene was then added onto 20 g of Davison 948 silica dried to 600° C. The resulting slurry was stirred for 1 hour at 25° C. Then a solution of 0.15 g of N,N-bis(2-hydroxylethyl)octadecylamine in 20 $cm^3$ toluene was added, and stirring continued for another 30 minutes. The final catalyst was then dried to free-flowing powder under vacuum at 65° C.

Polymerization

The catalyst was then tested for ethylene/1-hexene co-polymerization in the above continuous fluid bed gas-phase reactor operated at 300 psig total pressure, 71.1° C. reactor temperature, and 0.67 ft/s cycle gas velocity. The catalyst was fed at a rate that maintained a constant rate of product discharge from the reactor. The reactor gas mixture was composed of 30% ethylene, 0.91% 1-hexene and 267 ppm $H_2$. Sample was collected after 5 bed-turnovers and analyzed for properties shown in Table II below.

Example 9 (Comparative)

(methylcyclopentadienyl)(tetramethylcyclopentadienyl)zirconium dichloride

Preparation of Supported Catalyst

A solution of methylalumoxane (MAO) and metallocene was formed by adding 13.6 $cm^3$ of 30 wt-% MAO solution in toluene onto 0.1932 g of (methylcyclopentadienyl)(tetramethylcyclopentadienyl)zirconium dichloride in a vial. 20 $cm^3$ of fresh toluene was added, and the mixture stirred for 45 minutes at 25° C. This pre-mixed solution of the MAO and the metallocene was then added onto 10 g of Davison 948 silica dried to 600° C. The resulting slurry was stirred for 1 hour at 25° C. Then a solution of 0.0699 g of N,N-bis(2-hydroxylethyl)octadecylamine in 20 $cm^3$ toluene was added, and stirring continued for another 30 minutes. The final catalyst was then dried to free-flowing powder under vacuum at 65° C.

Polymerization

The catalyst was tested for the co-polymerization of ethylene/1-butene in a semi-batch gas-phase reactor at 85° C. The pressure in the reactor was held constant by continuously feeding 5 mol-% 1-butene in ethylene to compensate for any pressure change due to polymerization. After 1 h, the polymer formed was separated from the seed bed material and analyzed for resin molecular properties shown in Table II below.

Example 10 (Invention)

(n-propylcyclopentadienyl)(pentamethylcyclopentadienyl)zirconium dichloride

Polymerization

The supported catalyst made as in Example 1 above was tested for ethylene/1-hexene co-polymerization in a batch slurry reactor using isobutane as diluent. The reactor was operated at 325 psig total pressure, 130 psi ethylene partial pressure, and 85° C. reactor temperature. 60 $cm^3$ of 1-hexene was added to depress the density of the polymer. The properties of the formed polymer are shown in Table II below.

Example 11 (Invention)

(n-propylcyclopentadienyl)(tetramethylcyclopentadienyl)zirconium dichloride

Polymerization

The supported catalyst made as in Example 4 above was tested for ethylene/1-hexene co-polymerization in a batch slurry reactor using isobutane as diluent. The reactor was operated at 325 psig total pressure, 130 psi ethylene partial pressure, and 85° C. reactor temperature. 60 $cm^3$ of 1-hexene was added to depress the density of the polymer. The properties of the formed polymer are shown in Table II below.

TABLE II

| Example | Density (g/cc) | MI ($I_2$) | MIR ($I_{21}/I_2$) | Productivity (g/g-hr) |
|---|---|---|---|---|
| 4 | 0.9196 | 1.49 | 17.5 | 2213 |
| 5 | 0.9181 | 1.11 | 18.9 | 1511 |
| 6 (comparative) | 0.9184 | 0.84 | 31.7 | 1558 |
| 7 | 0.9170 | 1.03 | 18.8 | 3196 |
| 8 (comparative) | 0.9179 | 1.21 | 46.0 | 1871 |
| 9 (comparative) | 0.9223 | 0.43 | 35.8 | 920 (see Note 1) |
| 10 | 0.9234 | 0.22 | 18.3 | 2458 (see Note 1) |
| 11 | 0.9194 | 0.18 | 18.0 | 6490 (see Note 1) |

Note 1
Catalyst productivity expressed as $g_{PE}/(g_{CAT} \cdot h \cdot 150\ psi)$ II. Bridged Biscyclopentadienyl Catalyst Systems Preparation of Supported Catalyst A (fluorenyl(dimethylsilyl) 3-propylcyclopentadienyl zirconium dichloride)

Fluorenyl(dimethylsilyl) 3-propylcyclopentadienyl zirconium dichloride, 0.092 g, was stirred with 4.0 g 30% MAO (by weight in toluene, Albemarle) and 4.0 g toluene. After complete dissolution, it was mixed with 3.0 g SiO2 (dried at 600° C., Davison) and dried under high vacuum at room temperature for 12 hours.

Example 12 (Invention)

(fluorenyl(dimethylsilyl)3-n-propylcyclopentadienyl zirconium dichloride)

Polymerization

Slurry polymerizations were carried out in a 1 L. stainless steel autoclave using 800 ml isobutane as reaction solvent. Cocatalyst used was 1.6 mmol $AlEt_3$. Ethylene pressure was 120 psi and 60 ml hexene were used. 50 mg of catalyst A was added to the reaction mixture at a temperature of 150° F. In some instances it was necessary to add 10 mmol $H_2$ in order to obtain the desired polymer MI. The reaction was run for 40 minutes, then cooled and isobutane removed to obtain the polymer as a granular solid.

TABLE III

| Example | $H_2$ (mmol) | Yield (g) | Productivity (g/g-hr) | Density (g/cc) | MI | MIR |
|---------|------|-------|-----------|---------|------|------|
| 12a | 10 | 94 | 2823 | 0.9081 | 0.68 | 27.8 |
| 12b | 0 | 152 | 4565 | 0.902 | 0.2 | 26 |
| 12c | 0 | 162 | 4865 | 0.904 | 0.2 | 31 |

Example 13 (Invention)

(fluorenyl(dimethylsilyl)2-methyl-3-benzylindenyl zirconium dichloride)

A slurry polymerization similar to the above was performed with a different catalyst according to the invention. It was supported as described above. The resulting MI was 9.58, the density was 0.9154 and the MIR was 21.6. Copolymerization of Ethylene/Hexene in Gas Phase.

Example 14 (Invention)

(fluorenyl(dimethylsilyl)3-n-propylcyclopentadienyl zirconium dichloride)

Polymerizations were carried out in the above continuous gas phase unit with regular injections of the catalyst of example 12 under the following conditions: 326 mol ppm $H_2$, 0.32 mol % hexene, 31.0 mol % ethylene, and a temperature of 169° F. Product characteristics are presented in Table IV.

Example 15 (Comparative)

(fluorenyl(dimethylsilyl)3-methylcyclopentadienyl zirconium dichloride)

Polymerizations were carried out in the above continuous gas phase unit with regular injections of the comparative catalyst under the following conditions: 169.3 mol ppm $H_2$, 0.35 mol % hexene, 39.9 mol % ethylene at a temperature of 169° F. Product characteristics are presented in Table IV.

TABLE IV

| Example | Productivity (g/g-hr) | Density (g/cc) | MI | MIR | CDBI | MS (cN) |
|---------|---------|---------|------|------|------|------|
| 14 | 1529 | 0.9184 | 1.74 | 21.5 | 67.3 | 25.5 |
| 15 (C) | 735 | 0.9138 | 1.08 | 75.2 | 72.5 | 5.1 |

We claim:

1. A Group 3-6 metallocene catalyst compound comprising two π-bonded rings wherein the second of the two π-bonded rings comprises one or more $C_3$ or greater hydrocarbyl, hydrocarbylsilyl or hydrocarbylgermyl substituents bonded to the ring through a primary carbon atom, wherein:
   the total number of substituents on the rings is equal to a number from 5 to 10;
   said rings are asymmetrically substituted relative to one another;
   and
   the catalyst compound is supported.

2. A catalyst compound represented by the formula:

$L^A L^B L^C_i MAB$, where $L^A$ is a substituted cyclopentadienyl or heterocyclopentadienyl ancillary ligand π-bonded to M;
M is a Group 3-6 transition metal;
$L^B$ is a substituted cyclopentadienyl or heterocyclopentadienyl ancillary ligand π-bonded to M or is a heteroatom σ-bonded to M; the $L^A$ and $L^B$ ligands may be covalently bridged together through a Group 14 element linking group;
$L^C_i$, is an optional neutral, non-oxidizing ligand having a dative bond to M;
i equals 0 to 3; and,
A and B are independently monoanionic labile ligands, each having a dative bond to M; wherein has at least one $C_3$ or greater hydrocarbyl, hydrocarbylsilyl or hydrocarbylgermyl substituent bonded to the ring through a primary carbon atom, and wherein if said metallocene compound contains two π-bonded rings covalently bridged to each other, then said $C_3$ or greater hydrocarbyl, hydrocarbylsilyl or hydrocarbylgermyl substituent is attached at the 3 or 4 position on at least one of the rings through a primary carbon atom, where the ring carbon covalently bound to the bridge is counted as the 1 position and $L^A$ and $L^B$ are asymmetrically substituted relative to one another, and the total number of substituents on the rings is equal to a number from 3 to 10, and the catalyst compound is supported.

3. The compound of claim 2 wherein $L^B$ is a cyclopentadienyl-group containing ring which is substituted with from two to five substituent groups R having from 1 to 20 carbon, silicon or germanium atoms, substituted hydrocarbyl, hydrocarbylsilyl or hydrocarbylgermyl radicals wherein one or more hydrogen atoms is replaced by a halogen radical, an amido radical, a phosphido radical, an alkoxy radical, an aryloxy radical or any other radical containing a Lewis acidic or basic functionality.

4. The compound of claim 3 wherein both $L^A$ and $L^B$ are a cyclopentadienyl-group containing ring which is substituted with from two to five substituent groups R having from 1 to 20 carbon, silicon, or germanium atoms, substituted hydrocarbyl, hydrocarbylsilyl or hydrocarbylgermyl radicals wherein one or more hydrogen atoms is replaced by a halogen radical, an amido radical, a phosphido radical, an alkoxy radical, an aryloxy radical or any other radical containing a Lewis acidic or basic functionality.

5. The compound of claim 3 or 4 wherein either or both of $L^A$ or $L^B$ is a heterocyclopentadienyl ancillary ligand π-bonded to M.

6. The compound of claim 4 wherein both $L^A$ and $L^B$ are a cyclopentadienyl rings, $L^A$ having one substituent and $L^B$ having two or more substituents.

7. An olefin polymerization catalyst compound selected from the group consisting of: (tetramethyl-cyclopentadienyl)

(n-propyl-cyclopentadienyl)zirconium dichloride, (tetramethyl-cyclopentadienyl)(n-propyl-cyclopentadienyl)zirconium dimethyl, (pentamethyl-cyclopentadienyl)(n-propyl-cyclopentadienyl)zirconium dichloride, (pentamethyl-cyclopentadienyl)(n-propyl-cyclopentadienyl)zirconium dimethyl, (1,3-dimethylcyclopentadienyl)(n-butyl-cyclopentadienyl)zirconium dichloride, (1,3-dimethylcyclopentadienyl) (n-butyl-cyclopentadienyl)zirconium dimethyl, (tetramethyl-3-npropylcyclopentadienyl)(cyclopentadienyl) zirconium dichloride, (tetramethyl-3-npropylcyclopentadienyl)(cyclopentadienyl)zirconium dimethyl, (1-methyl-2-nbutylcyclopentadienyl)(methylcyclopentadienyl)zirconium dichloride, (1-methyl-2-nbutylcyclopentadienyl)(methylcyclopentadienyl)zirconium dimethyl, (1,2,4-trimethyl-3,5-di-nbutylcyclopentadienyl) zirconium dichloride, (1,2,4-trimethyl-3,5-di-n-butylcyclopentadienyl)zirconium dimethyl, (1-n-butylindenyl)(4-phenylindenyl)zirconium dichloride, and (1-n-butylindenyl)(4-phenylindenyl)zirconium dimethyl.

8. The compound of claim 1 wherein said $C_3$ or greater hydrocarbyl substituent is selected from the group consisting of: n-propyl, n-butyl, n-dodecyl, 2-ethylbutyl, 2-methylpropyl, 2-cyclohexylethyl, and benzyl.

9. The compound of claim 8, wherein said $C_3$ or greater hydrocarbyl substituent is the only substituent on the ring to which it is attached.

10. The compound of claim 9, wherein said $C_3$ or greater hydrocarbyl substituent is n-propyl.

11. A catalyst compound represented by the formula:

$$L^A L^B L^C_i MAB, \quad (1)$$

where $L^A$ is a substituted cyclopentadienyl or heterocyclopentadienyl ancillary ligand π-bonded to M;
M is a Group 3-6 transition metal;
$L^B$ is a substituted cyclopentadienyl or heterocyclopentadienyl ancillary ligand π-bonded to M or is a heteroatom σ-bonded to M;
the $L^A$ and $L^B$ ligands are covalently bridged together;
$L^C_i$ is an optional neutral, non-oxidizing ligand having a dative bond to M;
i equals 0 to 3; and,
A and B are independently monoanionic labile ligands, each having a σ-bond to M;
wherein at least one of $L^A$ or $L^B$ has at least one $C_3$ or greater hydrocarbyl, hydrocarbylsilyl or hydrocarbylgermyl substituent bonded to the ring through a primary carbon atom, wherein either the $L^A$ or $L^B$ is a cyclopentadienyl-group containing ring which is substituted with from two to five substituent groups R having from 1 to 20 carbon, silicon or germanium atoms, substituted hydrocarbyl, hydrocarbylsilyl or hydrocarbylgermyl radicals wherein one or more hydrogen atoms is replaced by a halogen radical, an amido radical, a phosphido radical, an alkoxy radical, an aryloxy radical or any other radical containing a Lewis acidic or basic functionality, wherein said $C_3$ or greater hydrocarbyl, hydrocarbylsilyl or hydrocarbylgermyl substituent is attached at the 3 or 4 position on at least one of the rings through a primary carbon atom, where the ring carbon covalently bound to the bridge is counted as the 1 position and $L^A$ and $L^B$ are asymmetrically substituted relative to one another.

12. The compound of claim 11, wherein said $C_3$ or greater hydrocarbyl substituent is the only substituent on the ring to which it is attached, and wherein said $C_3$ or greater hydrocarbyl substituent is n-propyl.

13. The compound of claim 11, wherein both $L^A$ and $L^B$ are a cyclopentadienyl-group containing ring which is substituted with from two to five substituent groups R having from 1 to 20 carbon, silicon or germanium atoms, substituted hydrocarbyl, hydrocarbylsilyl or hydrocarbylgermyl radicals wherein one or more hydrogen atoms is replaced by a halogen radical, an amido radical, a phosphido radical, an alkoxy radical, an aryloxy radical or any other radical containing a Lewis acidic or basic functionality, and wherein either or both of $L^A$ or $L^B$ is a heterocyclopentadienyl ancillary ligand π-bonded to M.

14. The compound of claim 13, wherein said $C_3$ or greater hydrocarbyl substituent is the only substituent on the ring to which it is attached, and wherein said $C_3$ or greater hydrocarbyl substituent is n-propyl.

15. The catalyst compound of claim 1, wherein the catalyst is capable of producing ethylene polymers having a compositional distribution index of greater than or equal to 60 (CDBI≧60), a melt index ratio ($I_{21}/I_2$) of less than about 35, and a melt strength (MS) according to the equation MS≧6.0−6.0×log(MI), wherein MI represents the melt index of the polymer.

16. The catalyst compound of claim 2, wherein the catalyst is capable of producing ethylene polymers having a compositional distribution index of greater than or equal to 60 (CDBI≧60), a melt index ratio ($I_{21}/I_2$) of less than about 35, and a melt strength (MS) according to the equation MS≧6.0−6.0×log(MI), wherein MI represents the melt index of the polymer.

17. A Group 4 metallocene catalyst compound comprising two π-bonded rings, at least one ring comprising one or more methyl, ethyl, or linear $C_3$ or greater hydrocarbyl, hydrocarbylsilyl or hydrocarbylgermyl substituents
bonded to the ring through a primary carbon atom; wherein said one or more linear $C_3$ or greater hydrocarbyl, hydrocarbylsilyl or hydrocarbylgermyl substituents are attached at the 4 position on the ring, where the ring carbon covalently bound to the bridge is counted as the 1 position;
the total number of substituents on the two π-bonded rings is 3 to 10;
said two π-bonded rings are asymmetrically substituted relative to one another;
the catalyst compound is supported.

18. The compound of claim 17 wherein said π-bonded rings have four or five methyl groups on the first ring and a linear $C_3$ or greater hydrocarbyl, hydrocarbylsilyl or hydrocarbylgermyl substituent on the second ring.

19. The compound of claim 18 wherein said π-bonded rings have four methyl groups on the first ring and a linear $C_3$ or greater hydrocarbyl, hydrocarbylsilyl or hydrocarbylgermyl substituent on the second ring.

20. The compound of claim 18 wherein the first of the two rings has four methyl groups.

21. The compound of claim 18 wherein the second of the two rings has said linear $C_3$ or greater hydrocarbyl substituent.

22. The compound of claim 12, wherein both $L^A$ and $L^B$ are a cyclopentadienyl-group containing ring which is substituted with from two to five substituent groups R having from 1 to 20 carbon, silicon or germanium atoms, substituted hydrocarbyl, hydrocarbylsilyl or hydrocarbylgermyl radicals wherein one or more hydrogen atoms is replaced by a halogen radical, an amido radical, a phosphido radical, an alkoxy radical, an aryloxy radical or any other radical containing a Lewis acidic or basic functionality, and wherein either or both of $L^A$ or $L^B$ is a heterocyclopentadienyl ancillary ligand π-bonded to M.

23. The compound of claim 22, wherein said $C_3$ or greater hydrocarbyl substituent is the only substituent on the ring to which it is attached, and wherein said $C_3$ or greater hydrocarbyl substituent is n-propyl.

24. The compound of claim 2 wherein the $L^A$ and $L^B$ ligands are covalently bridged together through a Group 14 element linking group.

25. An olefin polymerization catalyst compound selected from: (tetramethyl-cyclopentadienyl)dimethylsilyl(3-n-propyl-cyclopentadienyl)zirconium dichloride, (tetramethyl-cyclopentadienyl)dimethylsilyl(3-n-propyl-cyclopentadienyl)zirconium dimethyl, (tetrahydroindenyl)dimethylsilyl(3-n-propyl-cyclopentadienyl)zirconium dichloride, (tetrahydroindenyl)dimethylsilyl(3-n-propyl-cyclopentadienyl)dimethyl, (tetramethyl-cyclopentadienyl)dimethylsilyl(2-methyl-4-n-propylcyclopentadienyl)zirconium dichloride, (tetramethyl-cyclopentadienyl)dimethylsilyl(2-methyl-4-n-propylcyclopentadienyl)zirconium dimethyl, (indenyl)isopropylidene(3-n-propyl-cyclopentadienyl)zirconium dichloride, (indenyl)isopropylidene (3-n-propyl-cyclopentadienyl)zirconium dimethyl, (indenyl)dimethylsilyl(3-n-propyl-cyclopentadienyl)hafnium dichloride, (indenyl)dimethylsilyl(3-n-propyl-cyclopentadienyl hafnium dimethyl, (indenyl)dimethylsilyl(3-n-propyl-cyclopentadienyl) hafnium dichloride and (indenyl)dimethylsilyl(3-n-propyl-cyclopentadienyl)hafnium dimethyl.

* * * * *

UNITED STATES PATENT AND TRADEMARK OFFICE
CERTIFICATE OF CORRECTION

| | |
|---|---|
| PATENT NO. | : 7,829,495 B2 |
| APPLICATION NO. | : 10/930144 |
| DATED | : November 9, 2010 |
| INVENTOR(S) | : Joseph C. Floyd et al. |

It is certified that error appears in the above-identified patent and that said Letters Patent is hereby corrected as shown below:

At column 16, line 28, delete "wherein has" and insert --wherein $L^A$ has--.

Signed and Sealed this
Seventh Day of August, 2012

David J. Kappos
*Director of the United States Patent and Trademark Office*